UNITED STATES PATENT OFFICE 2,261,129

BREAD

Benjamin H. Adams, United States Navy

No Drawing. Application April 9, 1940,
Serial No. 328,710

1 Claim. (Cl. 99—90)

(Granted under the act of March 3, 1883, as
amended April 30, 1928; 370 O. G. 757)

This invention relates to bread, and has for an object to provide an improved emergency bread ration and a method of preparing the same, whereby a bread concentrated in weight and size will be provided, capable of being stored indefinitely and palatable for use at any time.

A further object of this invention is to provide a bread which may be stored indefinitely and yet retain the palatableness and roughage of fresh whole wheat bread, while at the same time providing a hard biscuit which makes thorough mastication imperative and aids in keeping the teeth and gums in a healthy condition.

A further object of this invention is to provide a bread which is reduced in weight approximately one-third the original weight of a whole wheat bread, and thereby provides a considerable saving in weight and space, both as to storage and transportation thereof.

With the foregoing and other objects in view, this invention consists in the method, construction and combination hereinafter disclosed and set forth in the following specification and hereinafter claimed.

This invention consists of slicing whole wheat bread and heating it in an oven at a temperature of 120 to 130° F. until the bread is thoroughly dehydrated. The dehydrated bread is then ground to a fine powder by any suitable device such as a mechanical grinder. Next, the powdered bread is moistened with a flour and water mixture, the mixture consisting of a level tablespoon of white flour to a cup of water. The wetted powder is then placed in suitable biscuit pans, individual biscuits being about one-fourth of an inch thick, and the pans are placed in an oven at a temperature of 120 to 130° F. until the biscuits are thoroughly dehydrated, after which the biscuits may be used or may be packed in glass or metal containers and hermetically sealed, whereupon they may be stored indefinitely, ready for use at any time. When opened they are found to be in as palatable and usable condition as when originally packed, with all of the advantages above listed.

It will be observed that the finished biscuits weigh about eleven ounces per original pound loaf of bread, thus providing an emergency bread ration concentrated in weight, as well as in size.

Other modifications and changes in the proportions and arrangements of the ingredients and in the method of preparing the same, may be made by those skilled in the art, without departing from the nature of the invention within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

A method of preparing an emergency bread ration comprising slicing whole wheat bread, heating the sliced bread in an oven at a temperature of 120 to 130° F. until the same is thoroughly dehydrated, grinding the dehydrated bread to a fine powder, wetting the powder with a mixture of flour and water, shaping the wetted powder into biscuit form, and then dehydrating the biscuit in an oven at the aforementioned temperature.

BENJAMIN H. ADAMS.